United States Patent
Hiasa et al.

(10) Patent No.: US 8,734,294 B2
(45) Date of Patent: May 27, 2014

(54) CONTROL DEVICE OF VEHICLE POWER TRANSMISSION DEVICE

(75) Inventors: Yasuhiro Hiasa, Toyota (JP); Tooru Matsubara, Toyota (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/988,224

(22) PCT Filed: Nov. 22, 2010

(86) PCT No.: PCT/JP2010/070845
§ 371 (c)(1),
(2), (4) Date: May 17, 2013

(87) PCT Pub. No.: WO2012/070110
PCT Pub. Date: May 31, 2012

(65) Prior Publication Data
US 2013/0244831 A1  Sep. 19, 2013

(51) Int. Cl.
*B60W 10/04* (2006.01)
*B60W 10/10* (2012.01)
(52) U.S. Cl.
USPC ............................ 477/115; 477/118; 475/324
(58) Field of Classification Search
USPC ....................... 477/70, 79, 80, 115, 156, 158; 475/323–325, 327
See application file for complete search history.

(56) References Cited

U.S. PATENT DOCUMENTS

| 7,094,174 | B2 * | 8/2006 | Miyazaki et al. | 475/324 |
| 2004/0242371 | A1 * | 12/2004 | Saitou | 477/70 |
| 2007/0155584 | A1 * | 7/2007 | Tabata et al. | 477/70 |
| 2007/0256871 | A1 | 11/2007 | Kaneko et al. | |

FOREIGN PATENT DOCUMENTS

| JP | A-10-227353 | 8/1998 |
| JP | A-2003-343716 | 12/2003 |
| JP | A-2004-347066 | 12/2004 |
| JP | A-2005-233261 | 9/2005 |
| JP | A-2006-105288 | 4/2006 |
| JP | A-2010-106968 | 5/2010 |

* cited by examiner

*Primary Examiner* — Justin Holmes
(74) *Attorney, Agent, or Firm* — Oliff PLC

(57) ABSTRACT

It is provided a control device of a vehicle power transmission device including a transmission capable of fixing a rotating member with either of engagement of a one-way clutch or engagement of an engagement device, the transmission having a predetermined shift stage formed on condition that at least the rotating member is fixed, if an input torque to the transmission is changed after the engagement of the engagement device, a torque capacity of the engagement device being temporarily reduced without changing the predetermined shift stage, and if a request for applying a driven torque is made during reduction of the torque capacity of the engagement device, the temporarily reduced torque capacity of the engagement device being recovered, and the driven torque being increased depending on a recovery status of the torque capacity.

6 Claims, 10 Drawing Sheets

|  | C1 | C2 | C3 | C4 | B1 | B2 | F1 |
|---|---|---|---|---|---|---|---|
| 1st | ○ |  |  |  |  | ◎ | ○ |
| 2nd | ○ |  |  |  | ○ |  |  |
| 3rd | ○ |  | ○ |  |  |  |  |
| 4th | ○ |  |  | ○ |  |  |  |
| 5th | ○ | ○ |  |  |  |  |  |
| 6th |  | ○ |  | ○ |  |  |  |
| 7th |  | ○ | ○ |  |  |  |  |
| 8th |  | ○ |  |  | ○ |  |  |
| R1 (MOTOR REV) |  |  | ○ |  |  | ○ |  |
| R2 (ENGINE REV) |  |  |  | ○ |  | ○ |  |
| N |  |  |  |  |  |  |  |

○ : ENGAGEMENT  ◎ : CONTROLLED OBJECT

CONTROL DEVICE OF VEHICLE POWER TRANSMISSION DEVICE

TECHNICAL FIELD

The present invention relates to a control device of a vehicle power transmission device including a transmission having a predetermined shift stage formed with engagement of a one-way clutch in addition to engagement of an engagement device.

BACKGROUND ART

A control device of a vehicle power transmission device is well known that includes a transmission capable of fixing the same rotating member with engagement of a one-way clutch and with engagement of an engagement device, the transmission having a predetermined shift stage formed on condition that at least the rotating member is fixed. For example, this corresponds to a control device of an automatic transmission described in Patent Document 1. The automatic transmission described in Patent Document 1 has a first speed gear stage (1st) as the predetermined shift stage (gear stage) and, at the time of normal start, the one-way clutch is automatically engaged to form the first speed gear stage. If acceleration is turned off during the first speed gear stage formed with such engagement of the one-way clutch and a driven state is achieved in which a drive power source side is rotated in accordance with a drive wheel side, the engagement of the one-way clutch is released. Therefore, during a so-called manual mode in which a shift stage is set based on selection through manual operation of a shift selection device, an engagement device (e.g., a brake) fixing the same rotating member (e.g., a rotating member A) as that fixed by the engagement of the one-way clutch is engaged so that the first speed gear stage is formed even in the driven state (i.e., a power transmission path is coupled (connected) between the drive power source and the drive wheels even in the driven state).

In this case, before start of the vehicle, the rotating member A is not rotated and the rotating member A may be eccentric due to its own weight relative to a supporting member (e.g., an input shaft or another rotating member). Therefore, if the brake is engaged during a manual mode, the rotating member A is fixed while remaining in the eccentric state. As a result, since the eccentricity of the rotating member A widens or narrows a gap between gears engaged with each other between members related to the rotating member A and the engaged gears come into contact with each other in a biased manner, gear noise and vibration may be increased as compared to the case that the gears come into contact with each other uniformly in a substantially aligned manner. In other words, noise/vibration performance (NV performance) may deteriorate. With regard to such a problem caused by engaging the brake in an eccentric state, Patent Document 1 describes that during the manual mode, the brake is engaged after a vehicle is started by actuating the one-way clutch to achieve the first speed gear stage. In particular, when members making up the one-way clutch (e.g., sprags) push an inner race toward the center, an aligning action of the sprags is implemented and, when the aligning action of the sprags becomes stable, the engagement state of the one-way clutch is maintained and, as a result, the rotating member A fixed by the one-way clutch is also aligned. Subsequently, the brake is engaged in the aligned state. This enables suppression of increase in gear noise and vibration.

PRIOR ART DOCUMENTS

Patent Documents

Patent Document 1: Japanese Laid-Open Patent Publication No. 2010-106968
Patent Document 2: Japanese Laid-Open Patent Publication No. 2004-347066
Patent Document 3: Japanese Laid-Open Patent Publication No. 2003-343716
Patent Document 4: Japanese Laid-Open Patent Publication No. 2006-105288

SUMMARY OF THE INVENTION

Problem to be Solved by the Invention

It is empirically found out that even when a brake is engaged during the aligned state of the rotating member A, if an input torque to a transmission (hereinafter, transmission input torque) changes (increases or decreases) after the engagement of the brake, gear noise and vibration tend to increase. It is considered that gear noise and vibration tend to increase because the rotation member A is caused to be in the eccentric state again due to some factors. The problem as described above is not known and no proposal has been made on suppressing deterioration of NV performance caused by a change in the transmission input torque after engagement of a brake.

The present invention was conceived in view of the situations and it is therefore an object of the present invention to provide a control device in a vehicle power transmission device including a transmission having a predetermined shift stage formed with engagement of a one-way clutch in addition to engagement of an engagement device, the control device capable of suppressing deterioration of NV performance caused by a change in a transmission input torque after engagement of the engagement device.

Means for Solving the Problem

To achieve the object, the present invention provides (a) a control device of a vehicle power transmission device including a transmission capable of fixing a rotating member with either of engagement of a one-way clutch or engagement of an engagement device, the transmission having a predetermined shift stage formed on condition that at least the rotating member is fixed, wherein (b) if an input torque to the transmission is changed after the engagement of the engagement device, a torque capacity of the engagement device is temporarily reduced without changing the predetermined shift stage.

Effect of the Invention

Consequently, if the input torque to the transmission is changed after the engagement of the engagement device, the torque capacity of the engagement device is temporarily reduced without changing the predetermined shift stage. Therefore, the aligning action of the one-way clutch is utilized when the engagement device is temporarily slipped or released, and the same rotating member fixed at the predetermined shift stage is aligned. Therefore, the deterioration of NV performance occurring due to a change in a transmission input torque after engagement of the engagement device can be suppressed. When the engagement device is temporarily slipped or released, the predetermined shift stage is formed with engagement of the one-way clutch to transmit a torque from a drive power source toward drive wheels.

Preferably, if a change amount of the input torque to the transmission is within a predetermined value, the temporarily reduced torque capacity of the engagement device is recovered. Consequently, the engagement device is engaged while the same rotating member fixed at the predetermined shift stage is aligned by utilizing the aligning action of the one-way clutch when the transmission input torque is stable, thereby suppressing occurrence of gear noise and vibration.

Preferably, if a request for applying a driven torque is made during reduction of the torque capacity of the engagement device (i.e., when the torque capacity is in a reduced state or the torque capacity is being reduced), the temporarily reduced torque capacity of the engagement device is recovered, and the driven torque is increased depending on a recovery status of the torque capacity. Consequently, the transmission input torque can be controlled so as not to input to the engagement device the driven torque equal to or greater than the torque transmittable through the torque capacity of the engagement device when the request for applying the driven torque is made, and the engagement device can be prevented from slipping.

Preferably, the torque capacity of the engagement device is maintained without changing the predetermined shift stage at a torque capacity smaller than a torque capacity required during a driving period and equal to or greater than a value that can ensure a torque capacity required during a driven period. Consequently, the torque capacity of the engagement device becomes insufficient during driving period and the driving torque is transmitted toward the drive wheels through the engagement of the one-way clutch. Therefore, the deterioration of NV performance during the driving period is suppressed by the aligning action of the one-way clutch. The torque capacity of the engagement device required during the driven period is ensured and the driven torque is properly transmitted. When the transmission input torque is relatively low, since the engagement device is engaged without a shortage of the torque capacity thereof, the aligning action of the one-way clutch is not expected and the NV performance deterioration is a concern; however, in the first place, when the transmission input torque is low, since the eccentricity of the rotating member A is smaller and the absolute values of gear noise and vibration are smaller as compared to when the transmission input torque is high, a problem is hardly caused.

Preferably, if a vehicle speed related value is in a range equal to or greater than a lowest vehicle speed related value defined by an upshift line for determining an upshift from the predetermined shift stage to a shift stage formed without use of the one-way clutch, the torque capacity of the engagement device is further reduced without changing the predetermined shift stage as compared to the case that the vehicle speed related value is in a range less than the lowest vehicle speed related value. Consequently, the engagement device is slipped or released in the area equal to or greater than the lowest vehicle speed related value in the upshift line. In other words, in the area equal to or greater than the lowest vehicle speed related value in the upshift line, an upshift is performed to the shift stage formed without use of the one-way clutch during the driven period and, therefore, it is not necessary to ensure the torque capacity of the engagement device required for the torque transmission during the driven period.

MODE FOR CARRYING OUT THE INVENTION

In the present invention, preferably, the transmission is a stepped automatic transmission with a plurality of gear ratios mechanically set in a stepwise manner. For example, this stepped automatic transmission is made up of various planetary-gear type multistage transmissions having, for example, four forward speeds, five forward speeds, six forward speeds, or more shift stages with a plurality of sets of rotating elements (rotating members) of a planetary gear device selectively coupled by engagement devices and a one-way clutch to achieve a plurality of gear stages (shift stages) in an alternative manner. Engagement devices such as multi-plate and single-plate clutches and brakes engaged by a hydraulic actuator or belt type brakes are widely used for the engagement devices in the planetary-gear type multistage transmission. Although an oil pump supplying operating oil for actuating the engagement devices may be, for example, an oil pump driven by a drive power source for running to discharge the operating oil, the oil pump may be driven by a dedicated electric motor disposed separately from the drive power source for running.

Preferably, it is desirable in terms of responsiveness that a hydraulic control circuit including the engagement devices directly supplies, for example, an output oil pressure of a linear solenoid valve to each of hydraulic actuators (hydraulic cylinders) of the engagement devices; however, the output oil pressure of the linear solenoid valve can be used as a pilot oil pressure to control a shift control valve such that the operating oil is supplied from the control valve to the hydraulic actuators.

Preferably, the linear solenoid valves are disposed in one-to-one correspondence to each of a plurality of engagement devices, for example; however various other forms are available and, for example, if a plurality of the engagement devices exists that is not engaged or subjected to the engagement/release control at the same time, a linear solenoid valve common to these devices can be disposed. The hydraulic control of all the engagement devices may not necessarily be provided by the linear solenoid valves, and the hydraulic control may partially or entirely be provided by an adjusting means other than the linear solenoid valves such as duty control of an ON-OFF solenoid valve. The phrase "supplying an oil pressure" as used herein means that "causing an oil pressure to act on" or "supplying operating oil controlled to the oil pressure".

Preferably, an engine, i.e., an internal combustion engine such as a gasoline engine and a diesel engine is widely used as the drive power source for running. An electric motor etc., may be used as an auxiliary drive power source for running in addition to the engine. Alternatively, only an electric motor may be used as the drive power source for running.

An embodiment of the present invention will now be described in detail with reference to the drawings.

Embodiment

Figure 1:
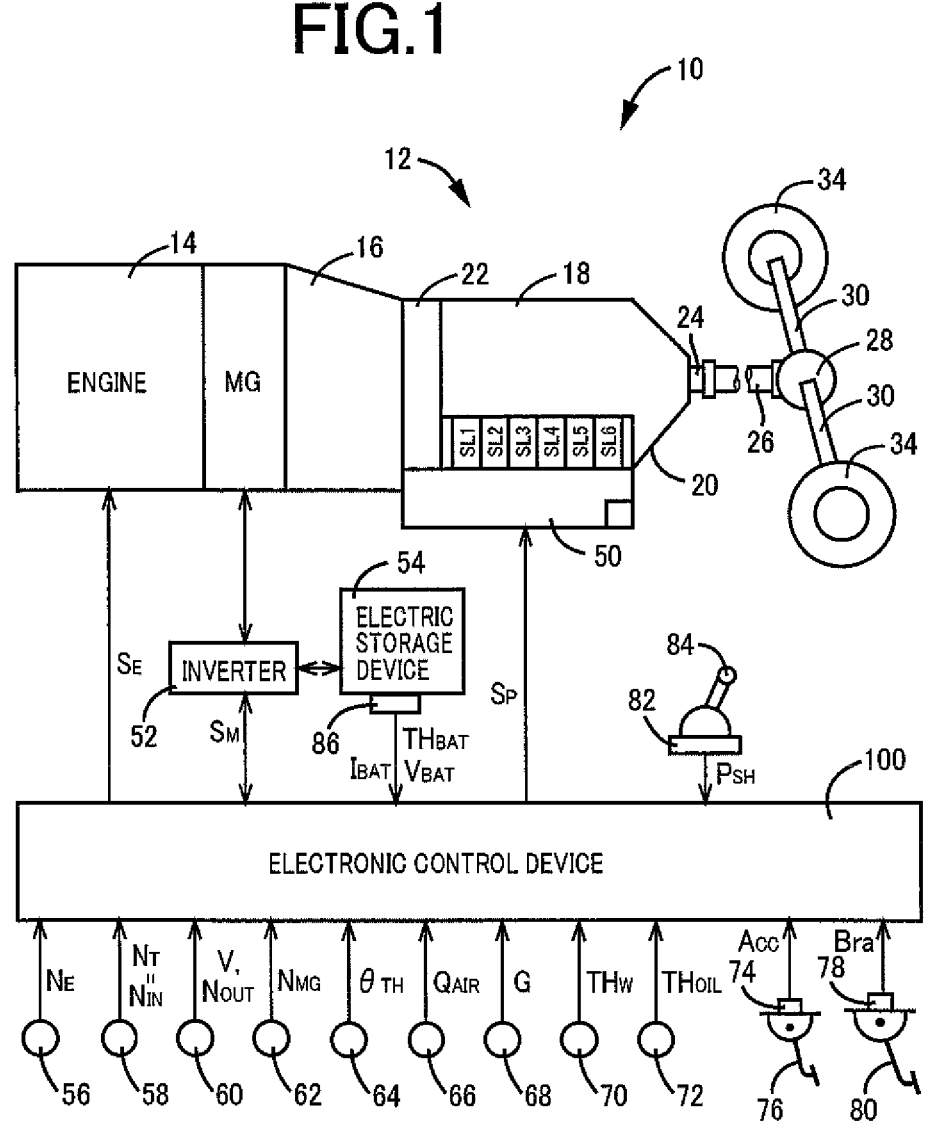
FIG. 1 is a diagram for explaining a general configuration of a power transmission path making up a vehicle to which the present invention is applied and is a diagram for explaining a main portion of a control system disposed in the vehicle.
Figures 2, 3:
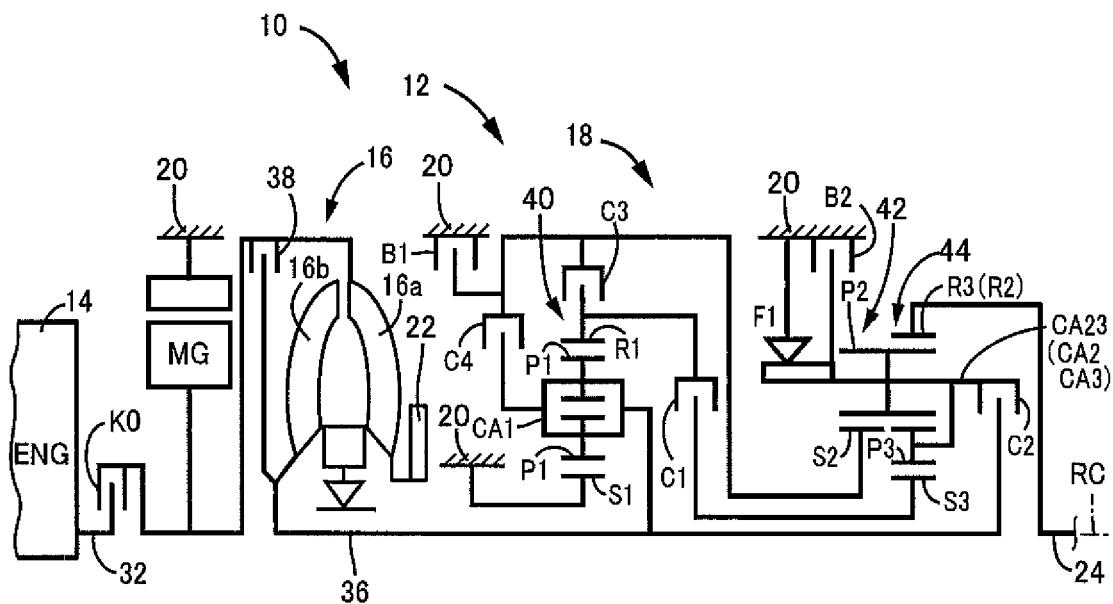
FIG. 2 is a schematic for explaining a vehicle power transmission device.
FIG. 3 is an operation chart for explaining relationship between shift operation of an automatic transmission and combinations of actuated engagement devices used for the automatic transmission.

FIG. 1 is a diagram for explaining a general configuration of a power transmission path from an engine 14 to drive wheels 34 making up a vehicle 10 to which the present invention is applied and is a diagram for explaining a main portion of a control system disposed in the vehicle 10 for output control of the engine 14, shift control of an automatic transmission 18 acting as a transmission, drive control of an electric motor MG etc. FIG. 2 is a schematic for explaining the automatic transmission 18. A torque converter 16, the automatic transmission 18, etc., are configured substantially symmetrically relative to a center line (an axial center RC) and lower halves from the center line are not depicted in FIG. 2. The axial center RC of FIG. 2 is a rotational axial center of the engine 14, the torque converter 16, and the electric motor MG.

In FIGS. 1 and 2, a vehicle power transmission device 12 (hereinafter referred to as the power transmission device 12) includes, an engine intermittent clutch K0, the electric motor MG the torque converter 16, an oil pump 22, the automatic transmission 18, etc., in order from the side of the engine 14, on the axial center RC in a transmission case 20 (hereinafter referred to as the case 20) acting as a non-rotating member attached to a vehicle body by bolts etc. The power transmission device 12 also includes a propeller shaft 26 coupled to an output shaft 24 that is an output rotating member of the automatic transmission 18, a differential gear device (differential gear) 28 coupled to the propeller shaft 26, a pair of axles 30 coupled to the differential gear device 28, etc. The power transmission device 12 configured as described above is preferably used in the vehicle 10 of the FR (front-engine rear-drive) type, for example. In the power transmission device 12, if the engine intermittent clutch K0 is engaged, the power of the engine 14 is transmitted from an engine coupling shaft 32 coupling the engine 14 and the engine intermittent clutch K0, sequentially through the engine intermittent clutch K0, the torque converter 16, the automatic transmission 18, the propeller shaft 26, the differential gear device 28, a pair of the axles 30, etc., to a pair of the drive wheels 34.

The engine intermittent clutch K0 is a wet multi-plate type hydraulic friction engagement device in which a plurality of friction plates overlapped with each other is pressed by a hydraulic actuator, and is subjected to engagement/release control by a hydraulic control circuit 50 disposed in the power transmission device 12 by using an oil pressure generated by the oil pump 22 as an original pressure. In the engagement/release control, a power-transmittable torque capacity of the engine intermittent clutch K0, i.e., an engagement force of the engine intermittent clutch K0 is varied, for example, continuously, through pressure adjustment of a linear solenoid valve etc., in the hydraulic control circuit 50. The engine intermittent clutch K0 includes a pair of clutch rotating members (a clutch hub and a clutch drum) relatively rotatable around the axial center RC in the released state thereof and one of the clutch rotating members (the clutch hub) is relatively non-rotatably coupled to the engine coupling shaft 32 while the other clutch rotating member (the clutch drum) is relatively non-rotatably coupled to a pump impeller 16a of the torque converter 16. Because of such a configuration, the engine intermittent clutch K0 rotates the pump impeller 16a integrally with the engine 14 via the engine coupling shaft 32 in the engaged state. Therefore, in the engaged state of the engine intermittent clutch K0, the drive power from the engine 14 is input to the pump impeller 16a. On the other hand, in the released state of the engine intermittent clutch K0, the power transmission between the pump impeller 16a and the engine 14 is interrupted.

The torque converter 16 is a hydraulic transmission device disposed to rotate around the axial center RC and transmitting a drive power input to the pump impeller 16a via fluid toward the automatic transmission 18. The pump impeller 16a is coupled sequentially through the engine intermittent clutch K0 and the engine coupling shaft 32 to the engine 14 and is an input-side rotating element receiving the input of the drive power from the engine 14 and rotatable around the axial center RC. A turbine impeller 16b of the torque converter 16 is an output-side rotating element of the torque converter 16 and is relatively non-rotatably coupled to a transmission input shaft 36 that is an input rotating member of the automatic transmission 18 by the spline fitting, etc. The torque converter 16 includes a lockup clutch 38. The lockup clutch 38 is a direct clutch disposed between the pump impeller 16a and the turbine impeller 16b and is put into an engaged state, a slip state, or a released state by hydraulic control etc.

The electric motor MG is a so-called motor generator having a function as a motor generating a mechanical drive power from electric energy and a function as an electric generator generating electric energy from mechanical energy. In other words, the electric motor MG may act as a power source generating a drive power for running instead of the engine 14 that is a power source or along with the engine 14. The electric motor MG also performs operations such as generating electric energy through regeneration from a drive power generated by the engine 14 or a driven power (mechanical energy) input from the side of the drive wheels 34 to accumulate the electric energy via an inverter 52 into an electric storage device 54. The electric motor MG is operatively coupled to the pump impeller 16a and power is mutually transmitted between the electric motor MG and the pump impeller 16a. Therefore, the electric motor MG is coupled to the transmission input shaft 36 in a power transmittable manner as is the case with the engine 14.

The oil pump 22 is a mechanical oil pump coupled to the pump impeller 16a and rotationally driven by the engine 14 (or the electric motor MG) to generate an operating oil pressure for providing the shift control of the automatic transmission 18, controlling the torque capacity of the lockup clutch 38, controlling engagement/release of the engine intermittent clutch K0, and supplying lubricant oil to the portions of the power transmission path of the vehicle 10.

The automatic transmission 18 is a planetary-gear type multistage transmission making up a portion of the power transmission path from the engine 14 to the drive wheels 34 and acting as a stepped automatic transmission shifted to selectively establish a plurality of shift stages (gear stages) by switching any of a plurality of the engagement devices, for example, hydraulic friction engagement devices, to be gripped (i.e., by engagement and release of the hydraulic friction engagement devices). The automatic transmission 18 is, for example, a stepped transmission executing a so-called clutch-to-clutch shift frequently used in known vehicles. The automatic transmission 18 has a first planetary gear device 40 of the double pinion type as well as a second planetary gear device 42 of the single pinion type and a third planetary gear device 44 of the double pinion type configured to be the Ravigneaux type on the same axis line (on the axial center RC) and changes the speed of the rotation of the transmission input shaft 36 to output the rotation from the output shaft 24. The transmission input shaft 36 is a turbine shaft rotationally driven by the turbine impeller 16b of the torque converter 16.

Each of the first planetary gear device 40, the second planetary gear device 42, and the third planetary gear device 44 has three rotating elements (rotating members) made up of a sun gear (S1, S2, S3), a carrier (CA1, CA2, CA3) supporting a pinion gear (P1, P2, P3) in a rotatable and revolvable manner, and a ring gear (R1, R2, R3) engaging via the pinion gear with the sun gear as is well known. The three rotating elements of each of the devices are partially coupled to each other or coupled to the transmission input shaft 36, the case 20, or the output shaft 24 directly or indirectly (or selectively) via the hydraulic friction engagement devices (clutches C1, C2, C3, C4 and brakes B1, B2) and a one-way clutch (unidirectional clutch) F1.

The clutches C1, C2, C3, C4 and brakes B1, B2 (hereinafter simply referred to as clutches C, brakes B, or engagement devices if not particularly distinguished) are hydraulic friction engagement devices frequently used in known vehicle automatic transmissions and are made up of wet multi-plate type clutches and brakes pressed by the hydraulic actuator, a band brake fastened by the hydraulic actuator, etc. The clutches C and the brakes B configured as described above are subjected to the engagement/release control by the hydraulic control circuit 50 such that respective torque capacities, i.e., engagement forces are varied, for example, continuously, through pressure adjustment of a linear solenoid valve etc., in the hydraulic control circuit 50, thereby selectively coupling members on the both sides of the engagement devices interposed therebetween. A torque capacity of an engagement device is determined by a friction coefficient of a friction material of the engagement device and an engagement oil pressure pressing friction plates, for example, and the transmission of a vehicle request torque without a slip of the engagement device requires a torque capacity equal to or greater than an assigned torque of the engagement device for the vehicle request torque. In this embodiment, a torque capacity of an engagement device may be used synonymously with an engagement oil pressure for convenience.

The engagement/release control of each of the clutches C and the brakes B establishes each gear stage (each shift stage) of eight forward speeds and two reverse speeds as depicted in an engagement operation table of FIG. 3 depending on accelerator operation of a driver, a vehicle speed V, etc. In FIG. 3, "1st" to "8th" mean the first to eighth speed forward gear stages; "R1" and "R2" mean the reverse gear stages; "N" means a neutral state having no gear stage established; and gear ratios γ (=input rotation speed $N_{IN}$/output rotation speed $N_{OUT}$) of the automatic transmission 18 corresponding to the gear stages are appropriately determined by gear ratios (=the number of sun gear teeth/the number of ring gear teeth) ρ1, ρ2, and ρ3 of the first planetary gear device 40, the second planetary gear device 42, and the third planetary gear device 44. The engagement operation table of FIG. 3 summarizes the relationship between the gear stages and the operation states of the clutches C and the brakes B with. "circles" indicative of engagement, a "double circle" indicative of a controlled object of "engagement oil pressure reduction control" described later in this embodiment, and blanks indicative of release.

Particularly, the automatic transmission 18 of this embodiment has the one-way clutch F1 that is disposed between the carriers CA2 and CA3 integrally coupled to each other (hereinafter referred to as a rotating member CA23) and the case 20 in parallel with the brake B2 and that allows positive rotation of the rotating member CA23 (in the same rotation direction as the transmission input shaft 36) while inhibiting negative rotation. Therefore, during a driving period while the engine 14 side rotationally drives the drive wheel 34 side, the first speed gear stage (1st) is established by automatic engagement of the one-way clutch F1 even if the brake B2 is not engaged. Therefore, the automatic transmission 18 of this embodiment can fix the same rotation member, i.e., the rotating member CA23, with either of engagement of the one-way clutch F1 or engagement of the brake B2, and the first speed gear stage is formed as a predetermined shift stage on condition that at least the rotating member CA23 is fixed.

Returning to FIG. 1, the vehicle 10 includes an electronic control device 100 including a control device of the power transmission device 12 related to the shift control of the automatic transmission 18, for example. The electronic control device 100 includes a so-called microcomputer including a CPU, a RAM, a ROM, and an I/O interface, for example, and the CPU executes signal processes in accordance with programs stored in advance in the ROM, while utilizing a temporary storage function of the RAM, to provide various controls of the vehicle 10. For example, the electronic control device 100 provides the hybrid drive control related to the engine 14 and the electric motor MG including regenerative control of the electric motor MG, the shift control of the automatic transmission 18, the torque capacity control of the lockup clutch 38, the torque capacity control of the engine intermittent clutch K0, etc., and is configured separately for the hybrid control and the hydraulic control as needed.

The electronic control device 100 is supplied with, for example, a signal indicative of an engine rotation speed $N_E$ that is the rotation speed of the engine 14 detected by an engine rotation speed sensor 56; a signal indicative of a turbine rotation speed $N_T$ of the torque converter 16 as an input rotation speed of the automatic transmission 18 detected by a turbine rotation speed sensor 58, i.e., a transmission input rotation speed $N_{IN}$ that is the rotation speed of the transmission input shaft 36; a signal indicative of a transmission output rotation speed $N_{OUT}$ that is the rotation speed of the output shaft 24 corresponding to the vehicle speed V or a rotation speed of the propeller shaft 26 as a vehicle speed related value detected by an output shaft rotation speed sensor 60; a signal indicative of an electric motor rotation speed $N_{MG}$ that is the rotation speed of the electric motor MG detected by an electric motor rotation speed sensor 62; a signal indicative of a throttle valve opening degree $\theta_{TH}$ that is an opening degree of an electronic throttle valve not depicted detected by a throttle sensor 64; a signal indicative of an intake air amount $Q_{AIR}$ of the engine 14 detected by an intake air amount sensor 66; a signal indicative of longitudinal acceleration G (or longitudinal deceleration G) of the vehicle 10 detected by an acceleration sensor 68; a signal indicative of a cooling water temperature $TH_W$ of the engine 14 detected by a cooling water temperature sensor 70; a signal indicative of an oil temperature $TH_{OIL}$ of the operating oil in the hydraulic control circuit 50 detected by an oil temperature sensor 72; a signal indicative of an accelerator opening degree $A_{CC}$ that is an operation amount of an accelerator pedal 76 as a drive power request amount (driver request output) for the vehicle 10 from a driver detected by an accelerator opening degree sensor 74; a signal indicative of a brake operation amount Bra that is an operation amount of a brake pedal 80 as a braking power request amount (driver request deceleration) for the vehicle 10 from a driver detected by a foot brake sensor 78; a signal indicative of a lever position (shift operation position, shift position, operation position) $P_{SH}$ of a shift lever 84, such as known "P", "N", "D", "R", and "S" positions, detected by a shift position sensor 82; and signals indicative of a battery temperature $TH_{BAT}$, a battery input/output current (battery charging/discharging current) $I_{BAT}$, and a battery voltage $V_{BAT}$ of the electric storage device 54 detected by a battery sensor 86. The electronic control device 100 sequentially calculates a state of charge (charging capacity) SOC of the electric storage device 54 based on the battery temperature $TH_{BAT}$, the battery charging/discharging current $I_{BAT}$, and the battery voltage $V_{BAT}$, for example.

The electronic control device 100 outputs, for example, an engine output control command signal $S_E$ for the output control of the engine 14; an electric motor control command signal $S_M$ for controlling the operation of the electric motor MG; and an oil pressure command signal $S_P$ for actuating electromagnetic valves (solenoid valves) included in the hydraulic control circuit 50 for controlling the hydraulic actuators of the engine intermittent clutch K0 and the clutches C and the brakes B of the automatic transmission 18.

Figure 4:
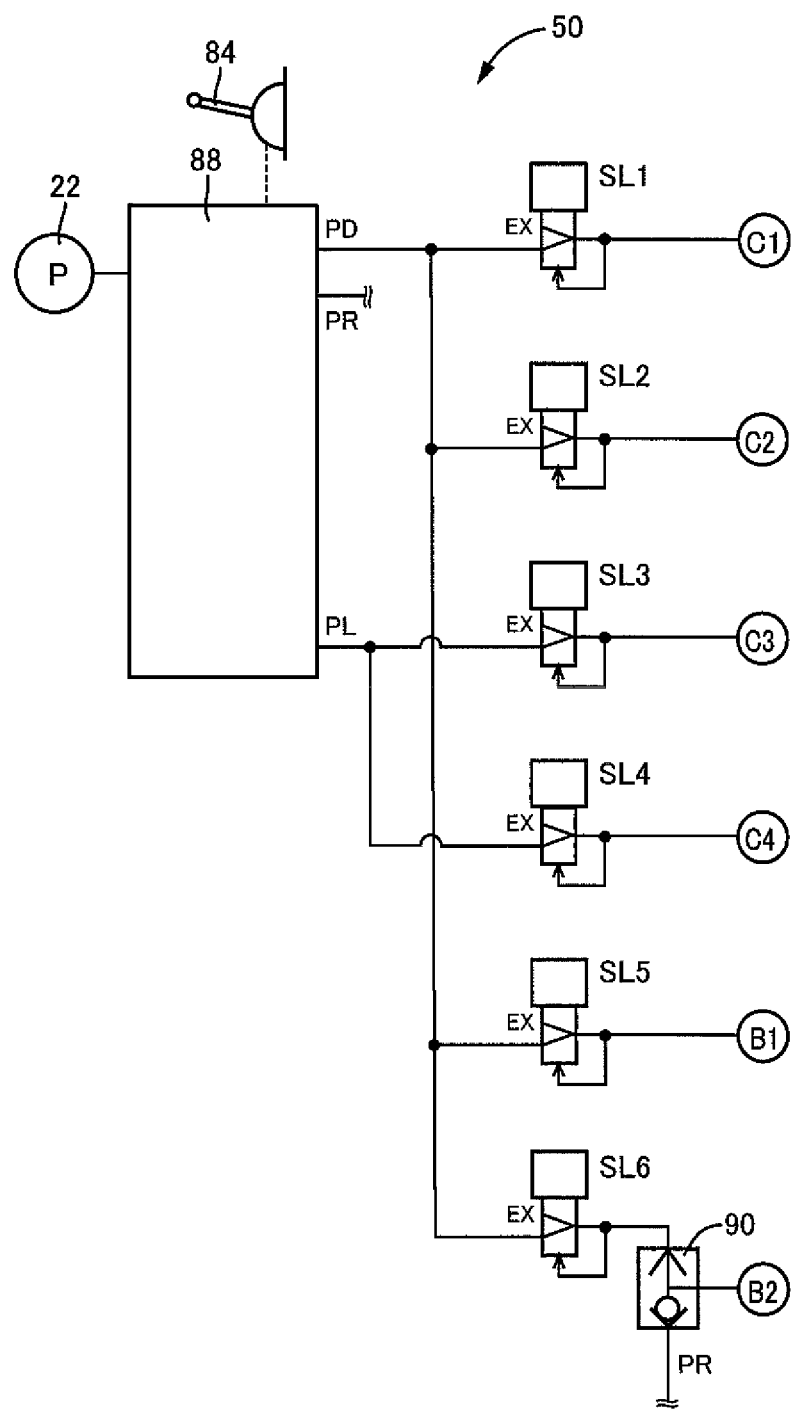
FIG. 4 is a circuit diagram related to linear solenoid valves controlling actuation of hydraulic actuators of clutches and brakes, and is a circuit diagram illustrating a main portion of a hydraulic control circuit depicted in FIG. 1.

FIG. 4 is a circuit diagram related to linear solenoid valves SL1 to SL6 etc., controlling actuation of hydraulic actuators of the clutches C1, C2, C3, C4 and the brakes B1, B2, and is a circuit diagram of a main portion of the hydraulic control circuit 50. In FIG. 4, the hydraulic actuators (hydraulic cylinders) of the clutches C1, C2 and the brakes B1, B2 are supplied with D-range pressures (forward range pressures) PD output from an oil pressure supply device 88 and respectively adjusted by the linear solenoid valves SL1, SL2, SL5, and SL6, and the hydraulic actuators of the clutches C3, C4 are supplied with line pressures PL output from the oil pressure supply device 88 and respectively adjusted by the linear solenoid valves SL3, SL4. The hydraulic actuator of the brake B2 is supplied with any one supplied oil pressure via a shuttle valve 90 out of the output oil pressure of the linear solenoid valve SL6 and a reverse pressure (reverse range pressure) PR. The oil pressure supply device 88 uses an oil pressure generated from the oil pump 22 as an original pressure to adjust the line oil pressure PL corresponding to an engine load (such as a vehicle request torque described later) represented by the accelerator opening degree $A_{CC}$ etc., and supplies the line oil pressure PL to the portions. The oil pressure supply device 88 includes a manual valve not depicted having oil passages mechanically or electrically switched in association with operation of the shift lever 84 and outputs the line oil pressure PL as the D-range pressure PD or the reverse pressure PR when the shift lever 84 is operated to the "D" or "R" position. The linear solenoid valves SL1 to SL6 are independently made excited or unexcited by the electronic control device 100. As a result, the oil pressures to the hydraulic actuators are independently adjusted and controlled to respectively control the engagement oil pressures of the clutches C and the brakes B.

Figure 5:
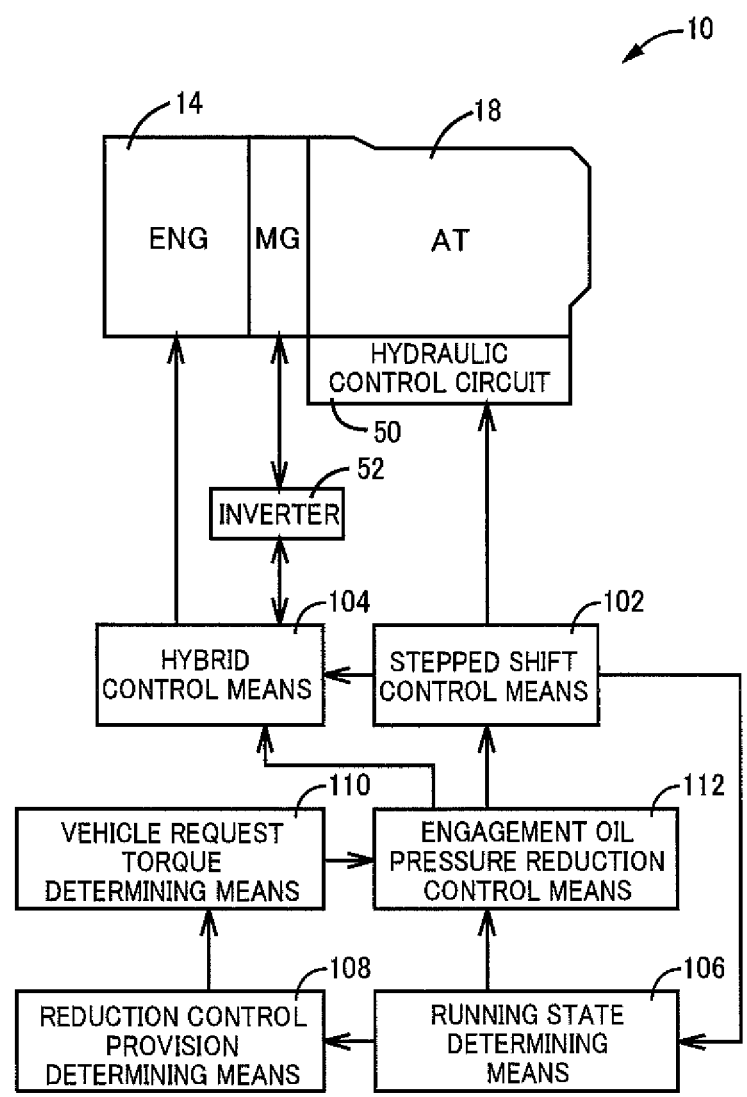
FIG. 5 is a functional block diagram for explaining a main portion of the control function of an electronic control device.

FIG. 5 is a functional block diagram for explaining a main portion of the control function of the electronic control device 100. In FIG. 5, a stepped shift control portion, i.e., a stepped shift control means 102 acts as a shift control means performing a shift of the automatic transmission 18. For example, the stepped shift control means 102 determines whether a shift of the automatic transmission 18 should be performed, i.e., determines a shift stage to be achieved by the automatic transmission 18, based on a vehicle state indicated by an actual vehicle speed V and the accelerator opening degree $A_{CC}$ from known relationship (shift diagram, shift map) having upshift lines and downshift lines stored in advance by using the vehicle speed V and the accelerator opening degree $A_{CC}$ (or transmission output torque $T_{OUT}$ etc.,) as variables, and provides automatic shift control of the automatic transmission 18 such that the determined shift stage is acquired. In this case, the stepped shift control means 102 outputs to the hydraulic control circuit 50 a command (shift output command, oil pressure command) $S_P$ causing engagement and/or release of the engagement devices involved with the shift of the automatic transmission 18 such that the shift stage is achieved in accordance with the engagement operation table depicted in FIG. 3, for example. The hydraulic control circuit 50 activates the linear solenoid valves SL1 to SL6 in the hydraulic control circuit 50 to actuate the hydraulic actuators of the engagement devices involved with the shift such that the shift of the automatic transmission 18 is performed by, for example, releasing the release-side engagement devices and engaging the engagement-side engagement devices in accordance with the command $S_P$.

A hybrid control portion, i.e., the hybrid control means 104 has a function as an engine drive control means controlling the drive of the engine 14 and a function as an electric motor operation control means controlling the operations of the electric motor MG as a drive power source or an electric generator through the inverter 52, and provides control of the hybrid drive by the engine 14 and the electric motor MG through these control functions. For example, the hybrid control means 104 calculates a request output (hereinafter referred to as a vehicle request output) for the vehicle 10 from the accelerator opening degree $A_{CC}$ and the vehicle speed V, calculates a request engine output $P_{ER}$ such that the vehicle request output is acquired in consideration of a transmission loss, an accessory load, and an electric motor torque $T_{MG}$, etc., and controls the engine 14 and the output and the electric generation of the electric motor MG so as to achieve the engine rotation speed $N_E$ and the engine torque $T_E$ for acquiring the request engine output $P_{ER}$.

For example, if engine running is performed by using the engine 14 as the drive power source for running, the hybrid control means 104 engages the engine intermittent clutch K0, thereby transmitting the drive power from the engine 14 to the pump impeller 16a. During the engine running, the hybrid control means 104 causes the electric motor MG operatively coupled to the pump impeller 16a to output an assist torque as needed. On the other hand, for example, if EV running (motor running) is performed by using only the electric motor MG as the drive power source for running, the hybrid control means 104 releases the engine intermittent clutch K0 to interrupt the power transmission path between the engine 14 and the torque converter 16 and causes the electric motor MG to output the drive power for running.

For example, during the inertia running (during coasting) with acceleration turned off or while a wheel brake is actuated by operating the brake pedal 80, the hybrid control means 104 provides regenerative control for converting kinetic energy of the vehicle 10 transmitted from the drive wheels 34 into electric energy with the electric motor MG to improve the fuel efficiency (reduce a fuel consumption rate). Specifically, the hybrid control means 104 provides the regenerative control rotationally driving and causing the electric motor MG to operate as an electric generator by a reverse drive force (a driven force) transmitted from the drive wheels 34 toward the engine 14 so as to charge the electric storage device 54 via the inverter 52 with the electric energy, i.e., an electric-motor generation current.

Specifically, during coasting of the vehicle 10, a target deceleration G* (driver request deceleration) corresponding to the vehicle speed V or the brake operation amount Bra is set and a braking torque (braking power) is generated such that the target deceleration G* is achieved. Although this braking torque is acquired from, for example, regenerative control, an engine brake, and a hydraulic brake, the braking torque from the regenerative control is given the highest priority in consideration of energy efficiency. If a greater braking torque is necessary or if a regenerative amount is limited due to input limitation of the electric storage device 54, a braking torque from the hydraulic brake or the engine brake is applied in addition to or instead of the braking torque from the regenerative control. For example, when the target deceleration G* is achieved by the regeneration and the hydraulic brake during deceleration with acceleration turned off, the hybrid control means 104 releases the engine intermittent clutch K0. Therefore, occurrence of pumping loss due to drag (rotation resistance) of the engine 14 is suppressed and the regeneration amount (regenerative torque) is accordingly increased.

A request torque (vehicle request torque) for the vehicle 10 at the drive wheels 34 corresponds one-to-one to the vehicle request output and is converted from the vehicle request output. The vehicle request torque is obviously a drive torque during the driving period while the engine 14 side rotationally drives the drive wheel 34 side, and also includes a braking torque, i.e., a driven torque, corresponding to the target deceleration G* during a driven period while the drive wheel 34 side rotationally drives the engine 14 side (the electric motor MG side). Therefore, the vehicle request torque is a positive torque during the driving period and is a negative torque during the driven period. The vehicle request torque can be converted into the transmission output torque $T_{OUT}$, which is a torque on the output shaft 24, the transmission input torque $T_{AT}$, which is a torque on the transmission input shaft 36, or an input torque of the power transmission device 12, which is a torque input to the pump impeller 16a. Therefore, the transmission output torque $T_{OUT}$, the transmission input torque $T_{AT}$, the input torque of the power transmission device 12, etc., are usable as the vehicle request torque, in addition to the output torque at the drive wheels 34. The accelerator opening degree $A_{CC}$, the throttle valve opening degree $\theta_{TH}$, the intake air amount $Q_{AIR}$, etc., are usable as the vehicle request torque.

Since the automatic transmission 18 of this embodiment has the first speed gear stage established by automatic engagement of the one-way clutch F1, only the clutch C1 may be engaged without engaging the brake B2 during the driving period at the time of vehicle start, for example. On the other hand, during the driven period while acceleration is turned off, the one-way clutch F1 is put into an idling state at the first speed gear stage and, therefore, the brake B2 must be engaged so as to acquire a regenerative torque or an engine brake torque. For example, when a so-called manual mode is selected to set a shift range or a shift stage as needed in accordance with a manual operation of the shift lever 84 or when a so-called sport mode is selected to give importance to running performance rather than fuel efficiency (i.e., to give importance to responsiveness of acceleration/deceleration), the brake B2 is desirably engaged at the first speed gear stage even during the driving period.

Before start of the vehicle, the rotating member CA23 (the carrier CA2 and the carrier CA3) is not rotated and the rotating member CA23 may be eccentric due to its own weight relative to the axial center RC. Therefore, if the brake B2 is engaged before start of the vehicle because the manual mode or the sport mode is selected, the rotating member CA23 is fixed while remaining in the eccentric state. As a result, since the eccentricity of the rotating member CA23 may increase gear noise and vibration during vehicle running as compared to an aligned state. In other words, noise/vibration performance (NV performance) may deteriorate. With regard to such a problem caused by engaging the brake B2 in the eccentric state, it is conceivable that, during the manual mode or the sport mode, after the first speed gear stage is achieved by the engagement of the one-way clutch F1 to start a vehicle and the rotating member CA23 is aligned by the aligning action of the one-way clutch F1, the brake B2 is engaged.

However, even when the brake B2 is engaged while the rotating member CA23 is in the aligned state, if the vehicle request torque (e.g., the transmission input torque $T_{AT}$) is changed after the engagement of the brake B2, the aligned state may be changed regardless of whether the vehicle request torque increases or decreases, facilitating increase in gear noise and vibration (particularly, gear noise and vibration may increase when the vehicle request torque increases). Additionally, the brake B2 is not engaged for a period because of utilization of the aligning action of the one-way clutch F1 and, in this period, a driven torque may not be acquired or a corresponding delay may occur until the driven torque is acquired even during the manual mode or the sport mode.

Therefore, if the vehicle request torque (e.g., the transmission input torque $T_{AT}$) is changed after the engagement of the brake B2, the electronic control device 100 of this embodiment provides the engagement oil pressure reduction control (brake oil pressure reduction control) temporarily reducing the torque capacity of the brake B2 (the engagement oil pressure of the brake B2) without changing the first speed gear stage. As a result, during the engagement oil pressure reduction control, the first speed gear stage is formed only with the engagement of the one-way clutch F1 and the rotating member CA23 is aligned again by the aligning action of the one-way clutch F1. For example, since the vehicle request torque is changed at the time of vehicle start associated with turning on of acceleration, if the brake B2 is engaged before start of the vehicle, the engagement oil pressure of the brake B2 is temporarily reduced immediately after acceleration is turned on so that the first speed gear stage is formed only with the engagement of the one-way clutch F1 to utilize the aligning action of the one-way clutch F1.

If a change amount of the vehicle request torque is within a predetermined value, the electronic control device 100 recovers the temporarily reduced torque capacity of the brake B2. In other words, if the change in the vehicle request torque is settled while the engagement oil pressure reduction control is provided, the electronic control device 100 terminates the provision of the engagement oil pressure reduction control.

If a request for applying a driven torque (hereinafter referred to as a driven request) is made while the engagement oil pressure reduction control is provided, i.e., if a braking torque associated with turning off of acceleration is set as the vehicle request torque, the electronic control device 100 recovers the temporarily reduced torque capacity of the brake B2. At the time of the recovery, the driven torque is increased depending on a recovery status of (i.e., an increase in) the torque capacity of the brake B2 so as not to input to the brake B2 the driven torque equal to or greater than the torque transmittable through the torque capacity of the brake B2. For example, the regenerative torque adjustable with a command to the electric motor MG or the engine brake torque adjustable with the torque capacity of the lockup clutch 38 is increased depending on the recovery status of the torque capacity of the brake B2.

Figure 6:
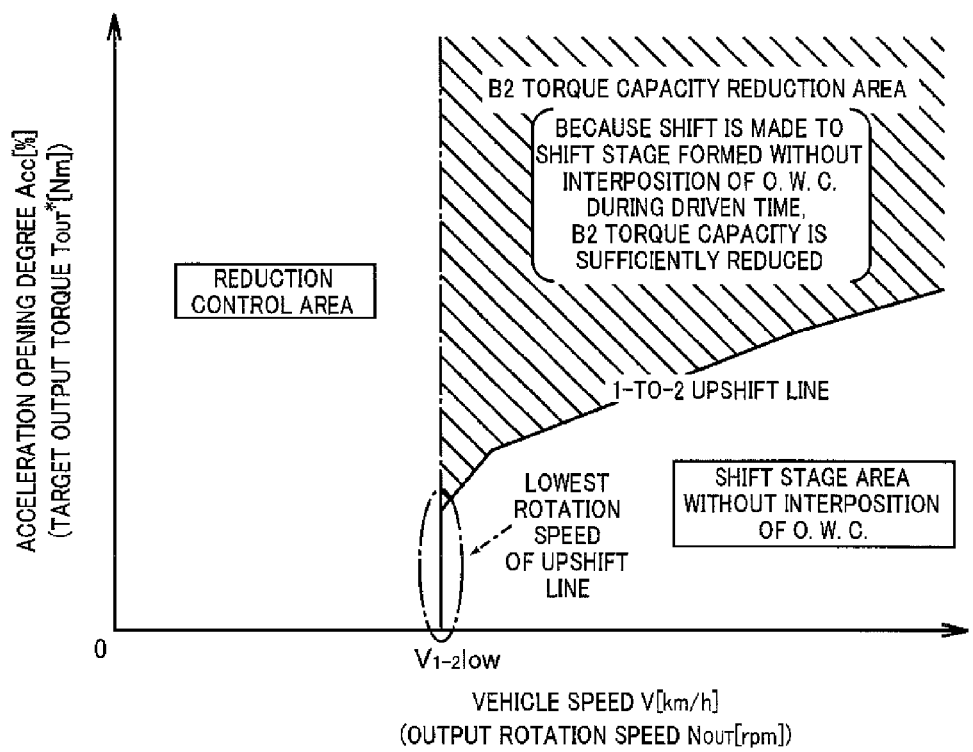
FIG. 6 is a diagram of a shift map used for the shift control of the automatic transmission, exemplarily depicting only a 1-to-2 upshift line.

If the vehicle speed V is present in an area equal to or greater than a lowest vehicle speed $V_{1-2}$low in a 1-to-2 upshift line for determining an upshift from the first speed gear stage to the second speed gear stage formed without use of the one-way clutch F1, the electronic control device 100 further reduces the torque capacity of the brake B2 without changing the first speed gear stage, as compared to the case that the vehicle speed V is present in an area less than the lowest vehicle speed $V_{1-2}$low. FIG. 6 is a diagram of a shift map used for the shift control of the automatic transmission 18, depicting only a 1-to-2 upshift line. In FIG. 6, the 1-to-2 upshift line indicated by a solid line is an upshift line for determining an upshift from the first speed gear stage formed by engaging the one-way clutch F1 and the brake B2 to the second speed gear stage formed without use of the one-way clutch F1. Therefore, in a hatched area in FIG. 6 equal to or greater than the lowest vehicle speed $V_{1-2}$low and within a first speed gear stage formation area, an upshift is performed to the second speed gear stage formed without use of the one-way clutch F1 during the driven period with acceleration turned off. Therefore, it is not necessary to engage the brake B2 such that the driven torque can be transmitted during the driven period. Thus, the engagement oil pressure reduction control provided in the hatched area sufficiently reduces the torque capacity of the brake B2 without changing the first speed gear stage, as compared to the engagement oil pressure reduction control provided in the case of less than the lowest vehicle speed $V_{1-2}$low. For example, the brake B2 may be released.

More specifically, returning to FIG. 5, the stepped shift control means 102 determines whether the currently set shift stage is the first speed gear stage formed by engaging the one-way clutch F1 or the brake B2. For example, if a vehicle is started by using the first speed gear stage, the first speed gear stage is set before start of the vehicle and the stepped shift control means 102 determines that the currently set shift stage is the first speed gear stage if the vehicle is not yet started.

If the stepped shift control means 102 determines that the currently set shift stage is the first speed gear stage, a running state determining portion, i.e., a running state determining means 106 determines whether the vehicle speed V is less than the lowest vehicle speed $V_{1-2}$low.

If the running state determining means 106 determines that the vehicle speed V is less than the lowest vehicle speed $V_{1-2}$low, a reduction control provision determining portion, i.e., a reduction control provision determining means 108 determines whether an engagement oil pressure reduction control means 112 described later is providing the engagement oil pressure reduction control.

If the running state determining means 106 determines that the vehicle speed V is less than the lowest vehicle speed $V_{1-2}$low, a vehicle request torque determining portion, i.e., a vehicle request torque determining means 110 determines whether the vehicle request torque (e.g., the transmission input torque $T_{AT}$) is changed by a predetermined torque or greater after the engagement of the brake B2 at the first speed gear stage. This predetermined torque is a reduction control provision determination value empirically obtained and set in advance for determining that the engagement oil pressure reduction control must be provided against increase in gear noise and vibration due to a change in the vehicle request torque after the engagement of the brake B2, for example. If the reduction control provision determining means 108 determines that the engagement oil pressure reduction control means 112 is providing the engagement oil pressure reduction control, the vehicle request torque determining means 110 determines whether a change amount of the vehicle request torque is within a predetermined value. The change amount of the vehicle request torque is a change in the vehicle request torque for a certain period and corresponds to a change rate (change gradient) of the vehicle request torque in a repeatedly executed control operation (e.g., flowchart of FIG. 8 described later). The predetermined value is, for example, a reduction control cancelation determination value empirically obtained and set in advance for determining that a change in the vehicle request torque is settled, i.e., a change in the vehicle request torque is converged and continued as a substantially constant torque. If the reduction control provision determining means 108 determines that the engagement oil pressure reduction control means 112 is providing the engagement oil pressure reduction control, the vehicle request torque determining means 110 determines whether the vehicle request torque is a negative torque to determine whether a driven request is made during provision of the engagement oil pressure reduction control.

If the vehicle request torque determining means 110 determines that the vehicle request torque is changed by a predetermined torque or greater after the engagement of the brake B2, an engagement oil pressure reduction control portion, i.e., an engagement oil pressure reduction control means 112 outputs to the stepped shift control means 102 an oil pressure reduction command for providing the engagement oil pressure reduction control temporarily reducing the engagement oil pressure command value of the brake B2 from the oil pressure necessary for the engagement of the brake B2 without changing the first speed gear stage. The stepped shift control means 102 reduces the engagement oil pressure command value of the brake B2 without changing the first speed gear stage in accordance with the oil pressure reduction command. The oil pressure necessary for the engagement of the brake B2 is an engagement oil pressure at which the torque capacity required for transmitting the vehicle request torque is obtained, for example, and is an oil pressure corresponding to the line oil pressure PL adjusted depending on the vehicle request torque acquired when the engagement oil pressure command value is set to the maximum value.

Figure 7A:
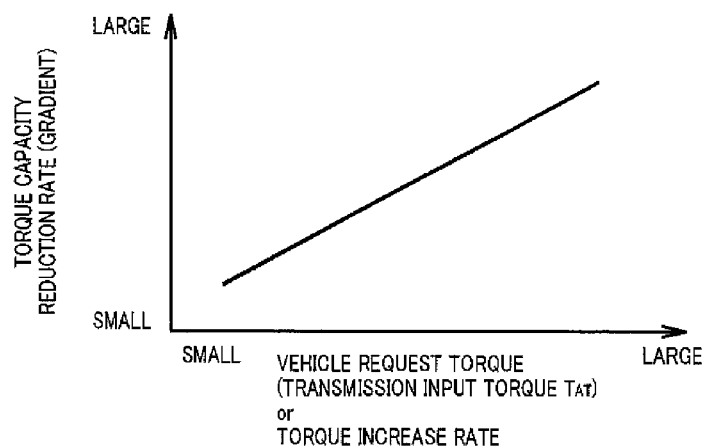
FIG. 7 is a diagram of each example in which (a) is a reduction rate map, (b) is a reduction-period torque capacity setting map, (c) is a recovery rate map.
Figure 7B:
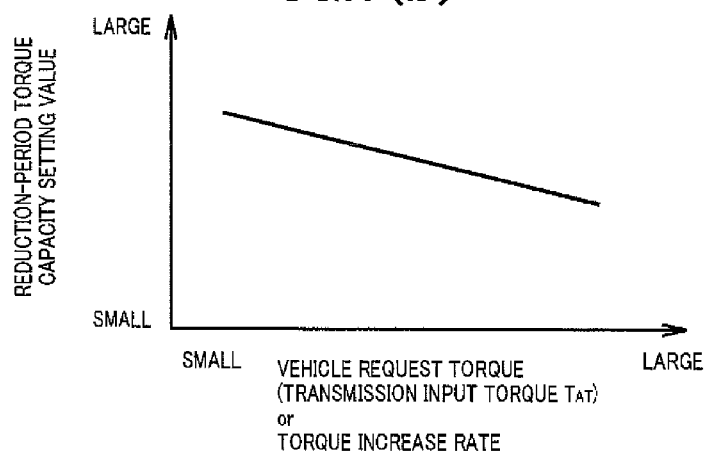

In an area having a relatively large absolute value of the vehicle request torque or an area having a relatively large increase rate of the vehicle request torque, a time is required for switching the vehicle request torque from a positive torque to a negative torque, i.e., the driving side is hardly changed to the driven side. In an area having a relatively large change rate of the vehicle request torque, gear noise and vibration tend to increase and the noise/vibration performance (NV performance) tends to deteriorate. Therefore, it is desired to reduce the torque capacity and suppress the deterioration of the NV performance as fast as possible (in other words, actively). On the other hand, in an area having a relatively small absolute value of the vehicle request torque or an area having a relatively small increase rate of the vehicle request torque, the driving side is easily changed to the driven side. Therefore, it is desired to suppress the reduction in the torque capacity such that the torque capacity of the brake B2 can be recovered in a responsive manner in preparation for the torque transmission when a driven request is made. Therefore, the stepped shift control means 102 sets a reduction rate (gradient) of the engagement oil pressure command value (torque capacity) of the brake B2 at the time of the engagement oil pressure reduction control such that the reduction rate (gradient) becomes larger when the absolute value of the vehicle request torque is larger or when the increase rate of the vehicle request torque is larger. A reduction rate map of FIG. 7(a) is obtained and set in advance from such a viewpoint. The stepped shift control means 102 also sets a setting value of the engagement oil pressure command value (torque capacity) of the brake B2 at the time of the engagement oil pressure reduction control such that the setting value becomes larger when the absolute value of the vehicle request torque is smaller or when the increase rate of the vehicle request torque is smaller. A reduction-period torque capacity setting map of FIG. 7(b) is obtained and set in advance from such a viewpoint. When the oil temperature $TH_{OIL}$ of the operating oil is lower, it is considered that a response delay more easily occurs in a change in the actual torque capacity relative to a change in the engagement oil pressure command value or a drag torque may be made larger in the brake B2 and may deteriorate the responsiveness at the time of recovery and, therefore, the reduction rate (gradient) of the engagement oil pressure command value (torque capacity) of the brake B2 may be made larger or the engagement oil pressure command value of the brake B2 may be set higher.

From another viewpoint, in an area having a relatively large absolute value of the vehicle request torque, even if the torque capacity of the brake B2 is relatively large, the brake B2 can be put into a slipping state to utilize the aligning action of the one-way clutch F1. Therefore, the torque capacity may not be reduced more than necessary and the responsiveness at the time of recovery from temporary reduction may be considered important. Thus, the stepped shift control means 102 may set the setting value of the engagement oil pressure command value (torque capacity) of the brake B2 at the time of the engagement oil pressure reduction control such that the setting value becomes larger when the absolute value of the vehicle request torque is larger. When the oil temperature $TH_{OIL}$ of the operating oil is lower, it is considered that the substantial torque capacity tends to be larger even if the setting value of the engagement oil pressure command value of the brake B2 is the same and, therefore, the engagement oil pressure command value (torque capacity) of the brake B2 may be set lower to facilitate the slipping state of the brake B2.

From another viewpoint, the stepped shift control means 102 may set the setting value of the engagement oil pressure command value (torque capacity) of the brake B2 at the time of the engagement oil pressure reduction control such that the setting value becomes at least equal to or higher than a low standby pressure (e.g., a value equivalent to a return spring) in the brake B2 so as to improve the responsiveness at the time of recovery from temporary reduction.

From another viewpoint, the stepped shift control means 102 may set the setting value of the engagement oil pressure command value (torque capacity) of the brake B2 at the time of the engagement oil pressure reduction control to an engagement oil pressure smaller than a torque capacity of the brake B2 required for the torque transmission during the driving period and equal to or greater than a value that can ensure a torque capacity of the brake B2 required for the torque transmission during the driven period. In other words, the engagement oil pressure command value of the brake B2 is set such that the torque capacity of the brake B2 becomes insufficient when the vehicle request torque during the driving period is relatively high so as to suppress the deterioration of the NV performance. However, if the engagement oil pressure command value of the brake B2 set in this case is too low, the driven torque cannot properly be transmitted during the driven period and, therefore, the engagement oil pressure command value of the brake B2 is set to a value at least ensuring the torque capacity corresponding to the driven torque expected during the driven period. The value smaller than the torque capacity of the brake B2 required for the torque transmission during the driving period is a value equal to or less than an assigned torque of the brake B2 for the current (actual) vehicle request torque, for example. The driven torque expected during the driven period is a value of a regenerative torque or an engine brake torque expected when acceleration is turned off such that switching from the driving state to the driven state can always be accommodated, and may be a constant compatible value (experimental value) obtained and set in advance for each of the vehicles 10 or a value set in each case depending on the vehicle speed V etc., from a predetermined relationship obtained and set in advance. The torque capacity corresponding to the driven torque may be set, for example, in consideration of a vehicle request torque when acceleration is turned off and an inertia torque associated with reduction in rotation speed of the rotating members in the automatic transmission 18, to be a torque capacity capable of transmitting a total torque of the vehicle request torque and the inertia torque. If a driving torque is lower than a torque transmittable with the engagement oil pressure command value for transmitting the driven torque, the aligning action of the one-way clutch F1 is not expected because of the engagement of the brake B2 and the NV performance deterioration is a concern; however, in the first place, when the driving torque is low, since it is believed that the absolute values of gear noise and vibration are smaller as compared to when the driving torque is high, a problem is hardly caused. If the engagement oil pressure reduction control means 112 commands the stepped shift control means 102 to provide the control of setting the engagement oil pressure command value of the brake B2 to a value capable of ensuring a torque capacity of the brake B2 required for the transmission of the driven torque as the engagement oil pressure reduction control, the engagement oil pressure reduction control means 112 may not be conditional on the determination that the vehicle request torque is changed by a predetermined torque or greater after the engagement of the brake B2 at the first speed gear stage and may give the command from the beginning when it is determined the shift stage is the first speed gear stage.

If the vehicle request torque determining means 110 determines that a change amount of the vehicle request torque is within a predetermined value during the provision of the engagement oil pressure reduction control, the engagement oil pressure reduction control means 112 outputs to the stepped shift control means 102 an oil pressure reduction cancelation command for canceling the engagement oil pressure reduction control being provided. The stepped shift control means 102 recovers the temporarily reduced engagement oil pressure command value of the brake B2 to an oil pressure necessary for the engagement of the brake B2 corresponding to the vehicle request torque (an oil pressure corresponding to the line oil pressure PL adjusted depending on the vehicle request torque) in accordance with the oil pressure reduction cancelation command. In other words, since the NV performance is hardly deteriorated if the vehicle request torque is in a stable state, the brake B2 is engaged again when the state is achieved. If the engagement oil pressure reduction control means 112 commands the stepped shift control means 102 to provide the control of setting the engagement oil pressure command value of the brake B2 to a value capable of ensuring the torque capacity of the brake B2 required for the transmission of the driven torque as the engagement oil pressure reduction control, i.e., if the driven torque is ensured from the beginning, the engagement oil pressure reduction control means 112 may not cancel the engagement oil pressure reduction control being provided even if it is determined that a change amount of the vehicle request torque is within a predetermined value during the provision of the engagement oil pressure reduction control.

Figure 7C:
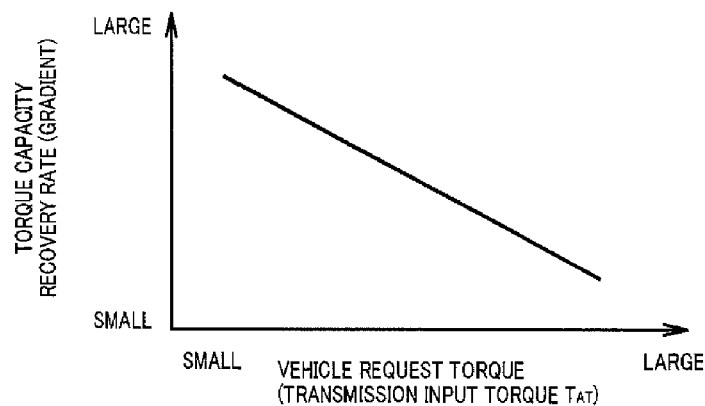

In an area having a relatively small absolute value of the vehicle request torque, the driving side is easily changed to the driven side. Therefore, it is desired to suppress the reduction in the torque capacity such that the torque capacity of the brake B2 can be recovered in a responsive manner in preparation for the torque transmission when a driven request is made. On the other hand, in an area having a relatively large absolute value of the vehicle request torque, the driving side is hardly changed to the driven side. Therefore, it is desired to maintain the brake B2 in the slipping state or the released state as long as possible to achieve the reduction of gear noise and vibration. Therefore, the stepped shift control means 102 sets a recovery rate (gradient) of the engagement oil pressure command value (torque capacity) of the brake B2 at the time of the engagement oil pressure reduction control such that the recovery rate (gradient) becomes larger when the absolute value of the vehicle request torque is smaller. A recovery rate map of FIG. 7(c) is obtained and set in advance from such a viewpoint. When the oil temperature $TH_{OIL}$ of the operating oil is lower, it is considered that a response delay more easily occurs in a change in the actual torque capacity relative to a change in the engagement oil pressure command value or a drag torque may be made larger in the brake B2 and may deteriorate the responsiveness at the time of recovery and, therefore, the recovery rate (gradient) of the engagement oil pressure command value (torque capacity) of the brake B2 may be made larger.

If the vehicle request torque determining means 110 determines that a driven request is made during provision of the engagement oil pressure reduction control, the engagement oil pressure reduction control means 112 outputs to the stepped shift control means 102 the oil pressure reduction cancelation command for canceling the engagement oil pressure reduction control being provided. The stepped shift control means 102 recovers the temporarily reduced engagement oil pressure command value of the brake B2 to an oil pressure necessary for the engagement of the brake B2 corresponding to the vehicle request torque in accordance with the oil pressure reduction cancelation command. In this case, it is conceivable that the torque capacity of the brake B2 is not recovered in time for the output of the driven torque. In such a case, the engagement oil pressure reduction control means 112 outputs to the hybrid control means 104 a driven torque increase command for increasing the driven torque depending on a recovery status of the torque capacity of the brake B2. The hybrid control means 104 provides feedback control of the output of the driven torque depending on the torque capacity (an engagement oil pressure command value) of the brake B2 in accordance with the driven torque increase command so as not to input the driven torque equal to or greater than the torque capacity of the brake B2, for example. As a result, the slipping state of the brake B2 (i.e., generation of a rotational difference in the one-way clutch F1) is properly avoided. If the engagement oil pressure reduction control means 112 commands the stepped shift control means 102 to provide the control of setting the engagement oil pressure command value of the brake B2 to a value capable of ensuring a torque capacity of the brake B2 required for the transmission of the driven torque as the engagement oil pressure reduction control, i.e., if the driven torque is ensured from the beginning, the engagement oil pressure reduction control means 112 may not cancel the engagement oil pressure reduction control being provided even if a driven request is made during provision of the engagement oil pressure reduction control.

If the running state determining means 106 determines that the vehicle speed V is equal to or greater than the lowest vehicle speed $V_{1-2}$low, the engagement oil pressure reduction control portion, i.e., the engagement oil pressure reduction control means 112 outputs to the stepped shift control means 102 an extra oil pressure reduction command for further reducing the torque capacity of the brake B2 without changing the first speed gear stage as compared to when the running state determining means 106 determines that the vehicle speed V is less than the lowest vehicle speed $V_{1-2}$low. The stepped shift control means 102 outputs an engagement oil pressure command value for sufficiently reducing the engagement oil pressure command value of the brake B2, for example, for releasing the brake B2, without changing the first speed gear stage, in accordance with the extra oil pressure reduction command.

Figure 8:
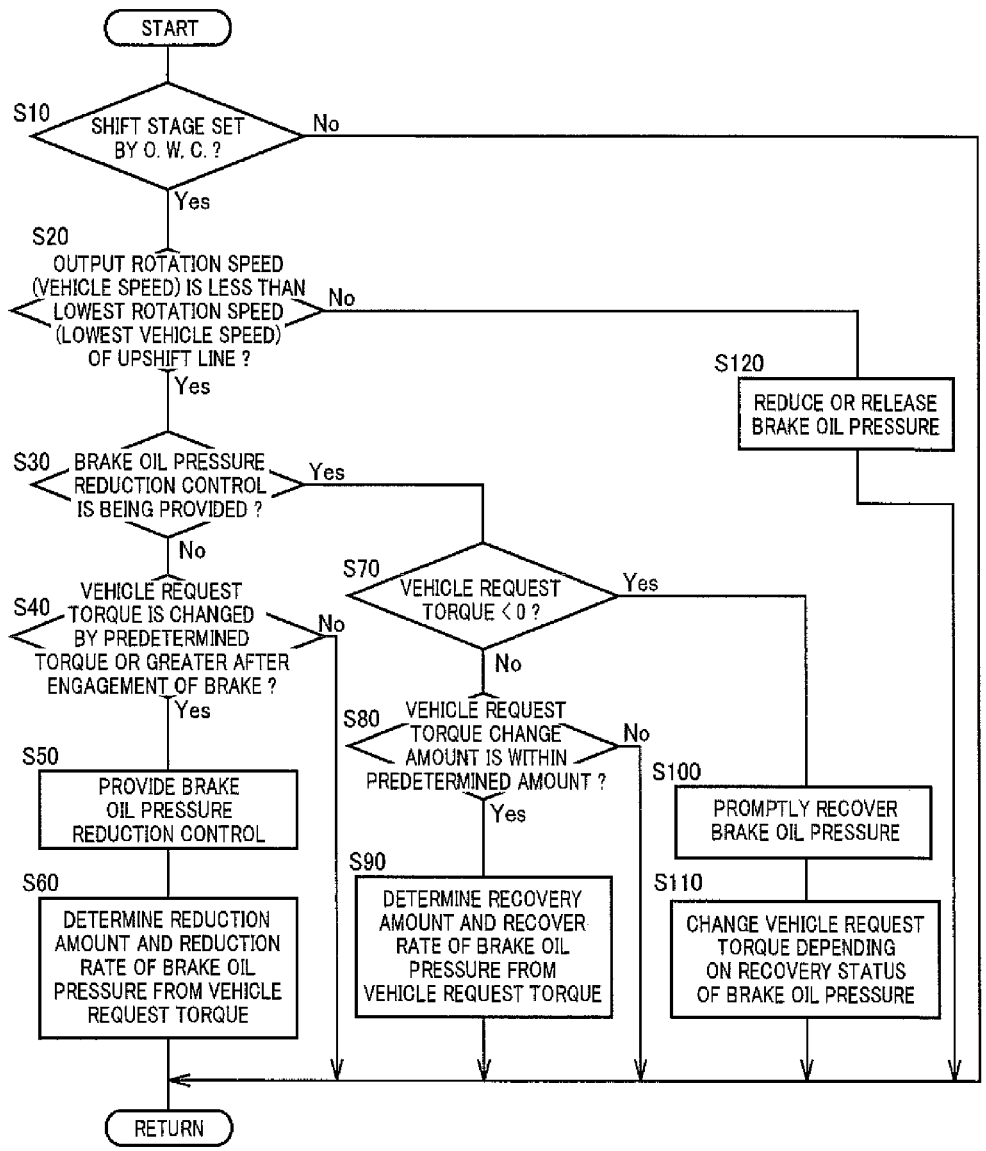
FIG. 8 is a flowchart for explaining a main portion of the control operation of the electronic control device, i.e., the control operation for suppressing the deterioration of NV performance caused by a change in vehicle request torque after engagement of an engagement device.
Figure 9:
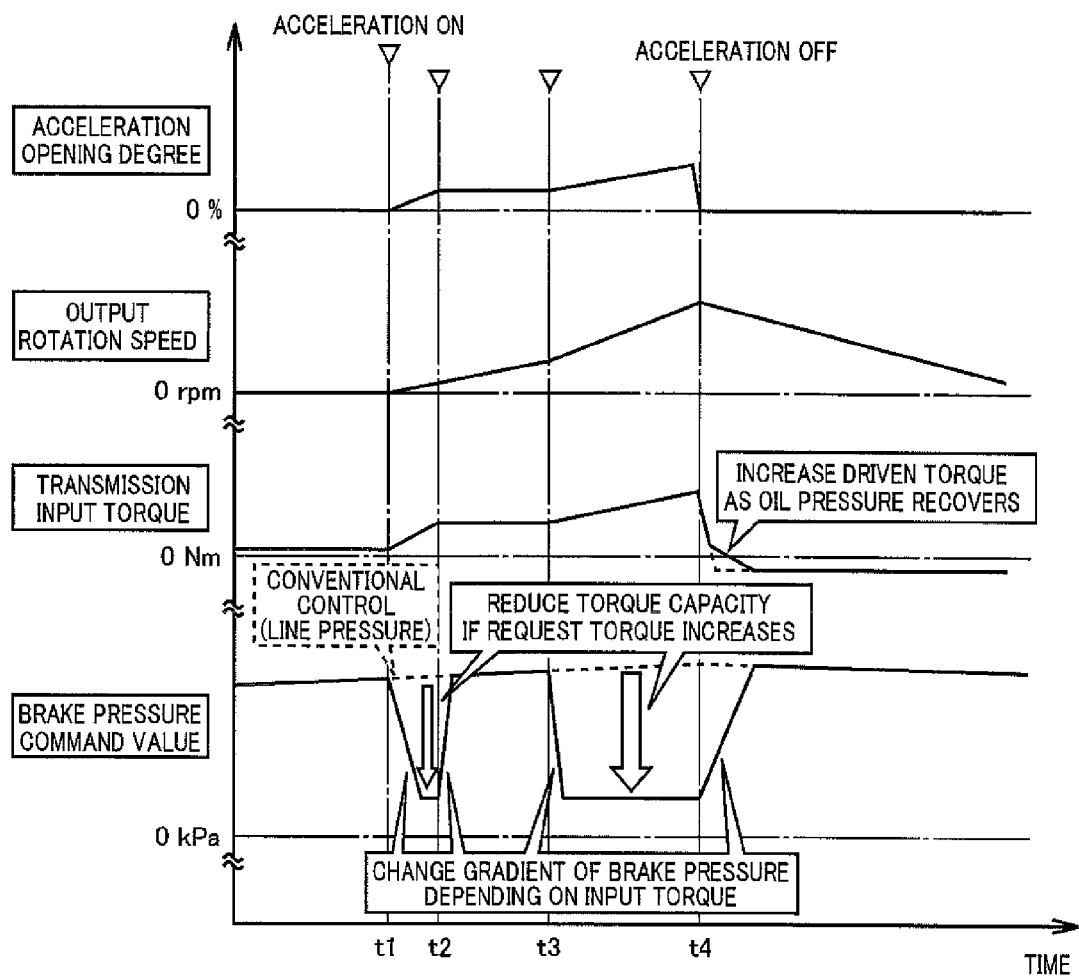
FIG. 9 is a time chart when the control operation described in the flowchart of FIG. 8 is performed and depicts an embodiment in the case of reducing the torque capacity of the engagement device depending on a change in the vehicle request torque associated with turning on of acceleration.
Figure 10:
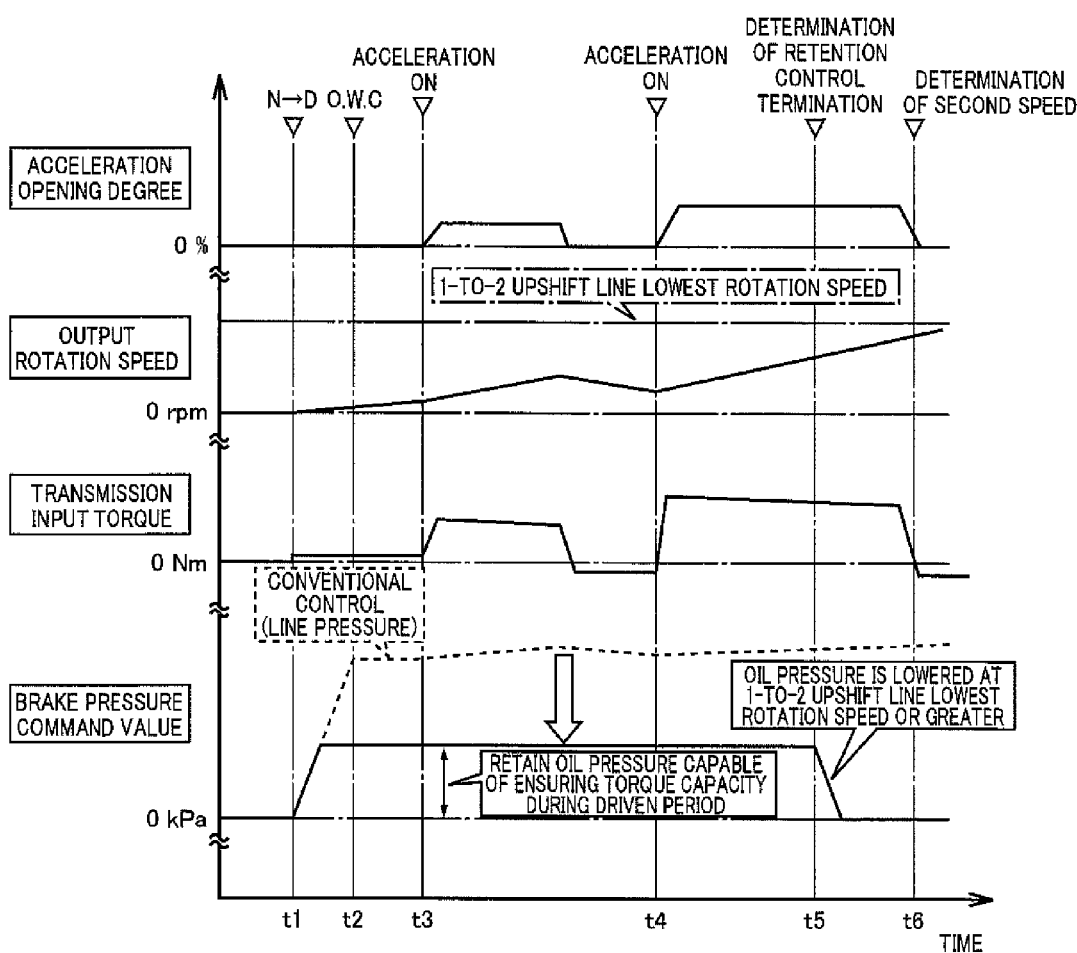
FIG. 10 is a time chart when the control operation described in the flowchart of FIG. 8 is performed and depicts an embodiment in the case of engaging the engagement device when it is determined that a predetermined shift stage is achieved.

FIG. 8 is a flowchart for explaining a main portion of the control operation of the electronic control device 100, i.e., the control operation for suppressing the deterioration of the NV performance caused by a change in vehicle request torque after engagement of the brake B2 and is repeatedly executed with an extremely short cycle time, for example, on the order of few msec to a few tens of msec. FIGS. 9 and 10 are time charts when the control operation described in the flowchart of FIG. 8 is performed. Specifically, FIG. 9 depicts an embodiment in the case of reducing the torque capacity of the brake B2 depending on a change in vehicle request torque associated with turning on of acceleration. FIG. 10 depicts an embodiment in the case of engaging the brake B2 when it is determined that the first speed gear stage is achieved.

In FIG. 8, first, at step (hereinafter, "step" will be omitted) S10 corresponding to the stepped shift control means 102, it is determined whether the current shift stage is the first speed gear stage formed by engaging the one-way clutch F1 or the brake B2, for example. If the determination at S10 is negative, this routine is terminated, and if affirmative (time t1 of FIG. 9 and time t1 of FIG. 10), it is determined at S20 corresponding to the running state determining means 106 whether the vehicle speed V is less than the lowest vehicle speed $V_{1-2}$low, for example. If the determination at S20 is affirmative, it is determined at S30 corresponding to the reduction control provision determining means 108 whether the engagement oil pressure reduction control is being provided, for example. In this case, it is determined that the engagement oil pressure reduction control is being provided obviously if the engagement oil pressure of the brake B2 is already reduced to a lower set pressure because of the engagement oil pressure reduction control and also if the engagement oil pressure of the brake B2 is being reduced toward the lower set pressure. If the determination at S30 is negative, it is determined at S40 corresponding to the vehicle request torque determining means 110 whether the vehicle request torque (e.g., the transmission input torque $T_{AT}$) is changed by a predetermined torque or greater after the engagement of the brake B2, for example. If the determination at S40 is negative, this routine is terminated, and if affirmative, at S50 corresponding to the engagement oil pressure reduction control means 112, for example, an oil pressure reduction command is output for providing the engagement oil pressure reduction control temporarily reducing the engagement oil pressure command value of the brake B2 from the oil pressure necessary for the engagement of the brake B2 without changing the first speed gear stage (time t1 to time t2, time t3 to time t4 of FIG. 9, and time t1 to time t5 of FIG. 10). Subsequently, at S60 corresponding to the stepped shift control means 102, for example, the engagement oil pressure command value of the brake B2 is reduced in accordance with the oil pressure reduction command without changing the first speed gear stage. For example, a reduction rate (gradient) of the engagement oil pressure command value (torque capacity) of the brake B2 is set such that the reduction rate (gradient) becomes larger when the absolute value of the vehicle request torque is larger or when the increase rate of the vehicle request torque is larger as depicted in the reduction rate map of FIG. 7(a). A setting value of the engagement oil pressure command value (torque capacity) of the brake B2 is set such that the setting value becomes larger when the absolute value of the vehicle request torque is smaller or when the increase rate of the vehicle request torque is smaller as depicted in the reduction-period torque capacity setting map of FIG. 7(b) time t1 to time t2, time t3 to time t4 of FIG. 9). Alternatively, the setting value of the engagement oil pressure command value (torque capacity) of the brake B2 is set to an engagement oil pressure value equal to or greater than a value that is smaller than a torque capacity of the brake B2 required for the torque transmission during the driving period and that is capable of ensuring a torque capacity of the brake B2 required for the torque transmission during the driven period (time t1 to time t5 of FIG. 10).

On the other hand, if the determination at S30 is affirmative, it is determined at S70 corresponding to the vehicle request torque determining means 110, for example, whether a driven request is made by turning off acceleration during provision of the engagement oil pressure reduction control, i.e., whether the vehicle request torque is changed to a negative torque. If the determination at S70 is negative, it is determined at S80 corresponding to the vehicle request torque determining means 110 whether a change amount of the vehicle request torque is within a predetermined value, for example. If the determination at S80 is negative, this routine is terminated, and if affirmative, at S90 corresponding to the engagement oil pressure reduction control means 112 and the stepped shift control means 102, an oil pressure reduction cancelation command is output for canceling the engagement oil pressure reduction control being provided, for example. The temporarily reduced engagement oil pressure command value of the brake B2 is recovered to an oil pressure necessary for the engagement of the brake B2 corresponding to the vehicle request torque in accordance with the oil pressure reduction cancelation command. For example, a recovery rate (gradient) of the engagement oil pressure command value (torque capacity) of the brake B2 is set such that the recovery rate (gradient) becomes larger when the absolute value of the vehicle request torque is smaller as depicted in the recovery rate map of FIG. 7(c) (time t2 to time t3 of FIG. 9). On the other hand, if the determination at S70 is affirmative, at S100 corresponding to the engagement oil pressure reduction control means 112, the oil pressure reduction cancelation command is output for canceling the engagement oil pressure reduction control being provided, for example (time t4 of FIG. 9). At S110 corresponding to the engagement oil pressure reduction control means 112, the stepped shift control means 102, and the hybrid control means 104, the temporarily reduced engagement oil pressure command value of the brake B2 is recovered to an oil pressure necessary for the engagement of the brake B2 corresponding to the vehicle request torque in accordance with the oil pressure reduction cancelation command of S100, for example. In this case, since it is conceivable that the torque capacity of the brake B2 may not be recovered in time for the output of the driven torque, a driven torque increase command is output for increasing the driven torque depending on a recovery status of the torque capacity of the brake B2. The feedback control of the output of the driven torque is provided depending on the torque capacity (engagement oil pressure command value) of the brake B2 in accordance with the driven torque increase command so as not to input the driven torque equal to or greater than the torque capacity of the brake B2 (after time t4 of FIG. 9). If the determination at S20 is negative, at S120 corresponding to the engagement oil pressure reduction control means 112 and the stepped shift control means 102, an extra oil pressure reduction command is output for further reducing the torque capacity of the brake B2 without changing the first speed gear stage as compared to the case that the determination at S20 is affirmative, for example. An engagement oil pressure command value is output for sufficiently reducing the engagement oil pressure command value of the brake B2, for example, for releasing the brake B2, without changing the first speed gear stage, in accordance with the extra oil pressure reduction command. In short, the engagement oil pressure of the brake B2 is set to zero (after time t5 of FIG. 10).

In FIG. 9, the engagement oil pressure of the brake B2 is reduced depending on the vehicle request torque at the same time when acceleration is turned on (time t1 to time t2 of FIG. 9). When the vehicle request torque becomes stable within a certain range, the engagement oil pressure of the brake B2 is recovered and the sufficient torque capacity corresponding to the vehicle request torque is ensured (time t2 to time t3 of FIG. 9). If the vehicle request torque is changed again after the engagement of the brake B2, the engagement oil pressure of the brake B2 is reduced depending on the vehicle request torque (time t3 to time t4 of FIG. 9). If acceleration is turned off during the engagement oil pressure reduction control and the driven request is made, the engagement oil pressure of the brake B2 is promptly recovered. In this case, to avoid a situation in which the driven torque is not properly transmitted because the engagement oil pressure of the brake B2 is not recovered in time, the vehicle request torque (the driven torque) is increased depending on a recovery status of the engagement oil pressure of the brake B2 (after time t4 of FIG. 9).

In FIG. 10, when the shift lever 84 is switched from the "N" position to the "D" position or when it is determined that the first speed gear stage is achieved, the brake B2 is engaged. In this case, the engagement oil pressure of the brake B2 is set to a value capable of ensuring a torque capacity during the driven period (a value lower than the line oil pressure PL) regardless of the vehicle request torque (time t1 to time t5 of FIG. 10). Therefore, even if the vehicle request torque is changed, an oil pressure capable of ensuring the torque capacity during the driven period is ensured. However, if the vehicle speed V becomes equal to or greater than the lowest vehicle speed $V_{1\text{-}2}$low, an upshift to the second speed gear stage is performed during the driven period with acceleration turned off (after time t6 of FIG. 10), the engagement oil pressure of the brake B2 is sufficiently reduced from the value capable of ensuring the torque capacity during the driven period. For example, the engagement oil pressure of the brake B2 is reduced toward zero and the brake B2 is released (after time t5 of FIG. 10).

Figure 11:
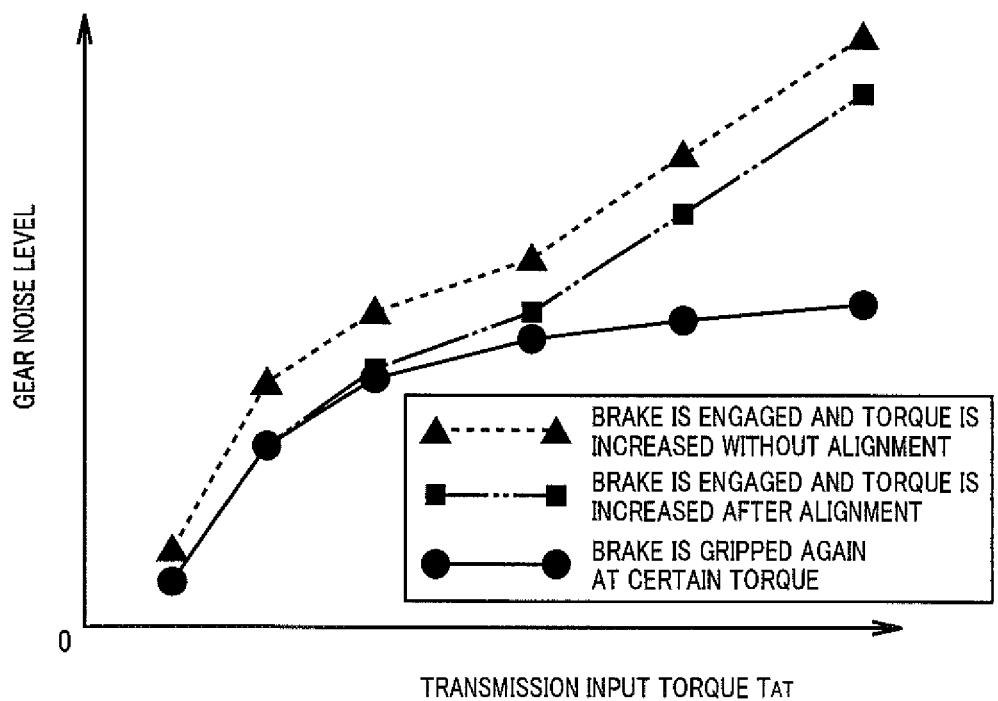
FIG. 11 depicts a measurement result of a gear noise level at a certain vehicle speed after a vehicle is started.

As described above, in this embodiment, the deterioration of NV performance occurring due to a change in the vehicle request torque after engagement of the brake B2 is suppressed by engaging the brake B2 again or by retaining the engagement oil pressure of the brake B2 at a value capable of ensuring the driven torque to utilize the aligning action of the one-way clutch F1. FIG. 11 depicts a measurement result of a gear noise level at a certain vehicle speed V after a vehicle is started. In FIG. 11, a broken line represents the case of engaging the brake B2 and increasing the transmission input torque $T_{AT}$ without alignment before start; a dashed-two dotted line represents the case of engaging the brake B2 and increasing the transmission input torque $T_{AT}$ after alignment; and a solid line represents an example in the case of engaging the brake B2 again each time the transmission input torque $T_{AT}$ is changed by a predetermined torque or greater. As is clear from FIG. 11, although the dashed-two dotted line indicates reduced gear noise as compared to the broken line, the gear noise is increased as compared to the solid line when the transmission input torque $T_{AT}$ is increased.

If the brake is engaged after a vehicle is started by actuating the one-way clutch to achieve the first speed gear stage, the deterioration of NV performance occurring due to a change in the vehicle request torque after engagement of the brake B2 cannot be suppressed and a considerable area is present for running without engagement of the brake B2. Therefore, the driven torque may not be transmitted or a delay may occur when the torque capacity during the driven period is ensured. In this regard, since the engagement oil pressure of the brake B2 during the driving period is set in consideration of the case where the driven request is made and the brake B2 is engaged from the time of start of the vehicle in this embodiment, the driven torque is properly transmitted. Therefore, this embodiment can achieve both the reduction of gear noise and the engagement of the brake B2 in preparation for the driven period.

As described above, according to the present embodiment, if the vehicle request torque (e.g., transmission input torque $T_{AT}$) is changed after the engagement of the brake B2, the torque capacity of the brake B2 (engagement oil pressure of the brake B2) is temporarily reduced without changing the first speed gear stage. Therefore, the aligning action of the one-way clutch F1 is utilized when the brake B2 is temporarily slipped or released, and the rotating member CA23 fixed at the first speed gear stage is aligned. Therefore, the deterioration of NV performance occurring due to a change in the vehicle request torque after engagement of the brake B2 can be suppressed.

According to the present embodiment, if a change amount of the vehicle request torque is within a predetermined value, the temporarily reduced torque capacity of the brake B2 is recovered. Therefore, the brake B2 is engaged while the rotating member CA23 fixed at the first speed gear stage is aligned by utilizing the aligning action of the one-way clutch F1 when the vehicle request torque is stable, thereby suppressing occurrence of gear noise and vibration.

According to the present embodiment, if the driven request is made during provision of the engagement oil pressure reduction control, the temporarily reduced torque capacity of the brake B2 is recovered, and the driven torque is increased depending on a recovery status of the torque capacity of the brake B2. Therefore, the vehicle request torque (e.g., regenerative torque or engine brake torque) can be controlled so as not to input to the brake B2 the driven torque equal to or greater than the torque transmittable through the torque capacity of the brake B2 when the driven request is made, and the brake B2 can be prevented from slipping during the driven period.

According to the present embodiment, the engagement oil pressure command value of the brake B2 during the engagement oil pressure reduction control is maintained at a torque capacity smaller than a torque capacity of the brake B2 required for the torque transmission during a driving period and equal to or greater than a value that can ensure a torque capacity of the brake B2 required for the torque transmission during a driven period. Therefore, the torque capacity of the brake B2 becomes insufficient during driving period and the driving torque is transmitted toward the drive wheels 34 through the engagement of the one-way clutch F1. Therefore, the deterioration of NV performance during the driving period is suppressed by the aligning action of the one-way clutch F1. The torque capacity of the brake B2 required during the driven period is ensured and the driven torque is properly transmitted.

According to the present embodiment, if the vehicle speed V is in a range equal to or greater than a lowest vehicle speed $V_{1-2}$low defined by the 1-to-2 upshift line for determining the upshift from the first speed gear stage to the second speed gear stage formed without use of the one-way clutch F1, the torque capacity of the brake B2 is further reduced without changing the first speed gear stage as compared to the case that the vehicle speed V is in a range less than the lowest vehicle speed $V_{1-2}$low. Therefore, the brake B2 is slipped or released in the area equal to or greater than the lowest vehicle speed $V_{1-2}$low in the 1-to-2 upshift line. In other words, in the area equal to or greater than the lowest vehicle speed $V_{1-2}$low in the 1-to-2 upshift line, an upshift is performed to the second speed gear stage formed without use of the one-way clutch F1 during the driven period and, therefore, it is not necessary to ensure the torque capacity of the brake B2 required for the torque transmission during the driven period.

Although the embodiment of the present invention has been described in detail with reference to the drawings, the present invention is applicable in other forms.

For example, in the embodiment, if the vehicle request torque is changed by a predetermined torque or greater after engagement of the brake B2, the engagement oil pressure reduction control means 112 provides the engagement oil pressure reduction control temporarily reducing the engagement oil pressure command value of the brake B2 without changing the first speed gear stage; however, the engagement oil pressure reduction control may be provided not only when the vehicle request torque is changed by a predetermined torque or greater but also if it is determined that the vehicle request torque is not stably continued, for example. In short, if the vehicle request torque is changed after engagement of the brake B2, the engagement oil pressure reduction control may be provided.

In the embodiment, the time chart of FIG. 10 is the embodiment in the case of performing the control operation represented by the flowchart of FIG. 8; however, at least S10, S20, S50, S60, and S120 only need to be included in the flowchart of FIG. 8 for the embodiment of FIG. 10.

Although the electric motor MG is disposed in the vehicle power transmission device 12 in the embodiment, the electric motor MG may not be disposed. Although the first speed gear stage is exemplarily illustrated as a predetermined shift stage, the predetermined shift stage may not necessarily be the first speed gear stage. Although the engagement devices engaged for forming the predetermined shift stage of the automatic transmission 18 are hydraulic friction engagement devices such as the clutches C and the brakes B, this is not a limitation and the engagement devices may be other engagement devices of an electro-magnetic type, a magnetic particle type, etc., such as electro-magnetic clutches, powder (magnetic particle) clutches, and meshing type dog clutches, for example. Although the automatic transmission 18 is an automatic transmission shifted and controlled to a shift stage determined based on a running state from a shift map, this is not a limitation and the automatic transmission 18 may be a manual transmission etc., shifted to a shift stage based only on operation of a driver, for example. The present invention is applicable as long as the vehicle power transmission device 12 includes a transmission that can fix the same rotating member with the engagement of the one-way clutch F1 and the engagement of the engagement device and that has a predetermined shift stage formed on condition that at least the rotating member is fixed.

In the embodiment, the vehicle request torque can be an output torque at the drive wheels 34 converted from a vehicle request output calculated from the accelerator opening degree $A_{CC}$ or the vehicle speed V as well as the transmission output torque $T_{OUT}$, the transmission input torque $T_{AT}$, the input torque of the power transmission device 12, etc., that can be converted from the vehicle request torque; however, this is not a limitation. For example, the vehicle request torque can be the transmission output torque $T_{OUT}$, the transmission input torque $T_{AT}$, etc., converted from the engine torque $T_E$ calculated such that the vehicle request output is acquired, or can be a torque value directly detected by using a torque sensor.

Although the torque converter 16 is used as a hydraulic transmission device in the embodiment, the torque converter 16 may not necessarily be included and another hydraulic power transmission device such as a fluid coupling (fluid coupling) without a torque amplification effect may be used instead of the torque converter 16.

The described embodiment is merely an exemplary embodiment and the present invention may be implemented in variously modified and improved forms based on the knowledge of those skilled in the art.

EXPLANATIONS OF LETTERS OR NUMERALS

12: vehicle power transmission device
18: automatic transmission (transmission)
100: electronic control device (control device)
C: clutch (engagement device)
B: brake (engagement device)
CA23: rotating member, carrier CA2 and carrier CA3 (the same rotating member)
F1: one-way clutch

The invention claimed is:

1. A control device of a vehicle power transmission device including a transmission capable of fixing a rotating member with either of engagement of a one-way clutch or engagement of an engagement device, the transmission having a predetermined shift stage farmed on condition that at least the rotating member is fixed,
if an input torque to the transmission is changed after the engagement of the engagement device, a torque capacity of the engagement device being temporarily reduced without changing the predetermined shift stage, and
if a request for applying a driven torque is made during reduction of the torque capacity of the engagement device, the temporarily reduced torque capacity of the engagement device being recovered, and the driven torque being increased depending on a recovery status of the torque capacity.

2. The control device of a vehicle power transmission device of claim 1, wherein if a vehicle speed related value is in a range equal to or greater than a lowest vehicle speed related value defined by an upshift line for determining an upshift from the predetermined shift stage to a shift stage formed without use of the one-way clutch, the torque capacity of the engagement device is further reduced without changing the predetermined shift stage as compared to the case that the vehicle speed related value is in a range less than the lowest vehicle speed related value.

3. The control device of a vehicle power transmission device of claim 1, wherein if a change amount of the input torque to the transmission is within a predetermined value, the temporarily reduced torque capacity of the engagement device is recovered.

4. The control device of a vehicle power transmission device of claim 3, wherein if a vehicle speed related value is in a range equal to or greater than a lowest vehicle speed related value defined by an upshift line for determining an upshift from the predetermined shift stage to a shift stage formed without use of the one-way clutch, the torque capacity of the engagement device is further reduced without changing the predetermined shift stage as compared to the case that the vehicle speed related value is in a range less than the lowest vehicle speed related value.

5. A control device of a vehicle power transmission device including a transmission capable of fixing a rotating member with either of engagement of a one-way clutch or engagement of an engagement device, the transmission having a predetermined shift stage formed on condition that at least the rotating member is fixed,
if an input torque to the transmission is changed after the engagement of the engagement device, a torque capacity of the engagement device is temporarily reduced without changing the predetermined shift stage, and
the torque capacity of the engagement device being maintained without changing the predetermined shift stage at a torque capacity smaller than a torque capacity required during a driving period and equal to or greater than a value that can ensure a torque capacity required during a driven period.

6. The control device of a vehicle power transmission device of claim 5, wherein if a vehicle speed related value is in a range equal to or greater than a lowest vehicle speed related value defined by an upshift line for determining an upshift from the predetermined shift stage to a shift stage formed without use of the one-way clutch, the torque capacity of the engagement device is further reduced without changing the predetermined shift stage as compared to the case that the vehicle speed related value is in a range less than the lowest vehicle speed related value.

* * * * *